United States Patent
Monfette et al.

(10) Patent No.: US 8,998,755 B2
(45) Date of Patent: Apr. 7, 2015

(54) VEHICLE POWERTRAIN HAVING A HYDRAULIC CONTINUOUSLY VARIABLE TRANSMISSION

(75) Inventors: David Monfette, Sherbrooke (CA); Eric Lafreniere, Saint-Nicephore (CA); Roger Rioux, Sherbrooke (CA); Daniel Duceppe, Rock Forest (CA)

(73) Assignee: Consortium de Recherche BRP—Universite de Sherbrooke S.E.N.C., Sherbrooke (CA)

( * ) Notice: Subject to any disclaimer, the term of this patent is extended or adjusted under 35 U.S.C. 154(b) by 294 days.

(21) Appl. No.: 13/496,401

(22) PCT Filed: Sep. 15, 2009

(86) PCT No.: PCT/CA2009/001305
§ 371 (c)(1),
(2), (4) Date: Mar. 15, 2012

(87) PCT Pub. No.: WO2011/032255
PCT Pub. Date: Mar. 24, 2011

(65) Prior Publication Data
US 2012/0178562 A1    Jul. 12, 2012

(51) Int. Cl.
*F16H 59/00* (2006.01)
*F16H 9/18* (2006.01)
(Continued)

(52) U.S. Cl.
CPC *F16H 9/18* (2013.01); *F16H 55/56* (2013.01); *F16H 57/021* (2013.01); *F16H 61/66259* (2013.01); *F16H 61/66272* (2013.01); *F16H 63/065* (2013.01)

(58) Field of Classification Search
CPC .............. F16H 55/56; F16H 61/66259; F16H 61/66272; F16H 63/065
USPC .................................. 474/18, 28, 91
See application file for complete search history.

(56) References Cited

U.S. PATENT DOCUMENTS 4,161,894 A * 7/1979 Giacosa .......................... 477/48
4,494,943 A * 1/1985 Takei et al. ..................... 474/28
(Continued)

FOREIGN PATENT DOCUMENTS

| | | |
|---|---|---|
| CN | 101517279 A | 8/2009 |
| DE | 102004038315 A1 | 3/2006 |
| WO | 2008037665 A1 | 4/2008 |

OTHER PUBLICATIONS

English abstract from DE 102004038315; retrieved from Espacenet on Mar. 19, 2013.
(Continued)

*Primary Examiner* — William E Dondero
*Assistant Examiner* — Minh Truong
(74) *Attorney, Agent, or Firm* — BCF LLP

(57) ABSTRACT

A vehicle powertrain has an engine, a driving shaft having a passage defined therein, a driven shaft, a pump, a hydraulic fluid reservoir, and a CVT. A driving pulley of the CVT includes a fixed sheave and a movable sheave disposed on the driving shaft for rotation therewith, a spring biasing a movable sheave away from the fixed sheave, and a CVT chamber fluidly communicating with the passage of the driving shaft. The pump supplies hydraulic fluid from the reservoir to the passage in the driving shaft. The hydraulic fluid flows from the passage to the CVT chamber to create a hydraulic pressure in the CVT chamber. The hydraulic pressure in the CVT chamber biases the movable sheave toward the fixed sheave.

24 Claims, 14 Drawing Sheets

(51) Int. Cl.
*F16H 55/56* (2006.01)
*F16H 57/021* (2012.01)
*F16H 61/662* (2006.01)
*F16H 63/06* (2006.01)

(56) References Cited

U.S. PATENT DOCUMENTS

| | | | |
|---|---|---|---|
| 4,560,369 A * | 12/1985 | Hattori | 474/28 |
| 4,617,004 A | 10/1986 | Mott | |
| 4,702,725 A * | 10/1987 | Kouno et al. | 474/28 |
| 4,747,808 A * | 5/1988 | Moan | 474/28 |
| 5,263,387 A * | 11/1993 | Reniers | 474/28 |
| 5,439,419 A * | 8/1995 | Yamada et al. | 474/18 |
| 5,667,448 A | 9/1997 | Friedmann | |
| 5,711,730 A | 1/1998 | Friedmann et al. | |
| 5,776,028 A * | 7/1998 | Matsuda et al. | 477/45 |
| 6,117,045 A * | 9/2000 | Hopper | 477/44 |
| 6,350,215 B1 * | 2/2002 | Gierling | 475/159 |
| 6,361,470 B1 | 3/2002 | Friedmann et al. | |
| 6,387,000 B1 * | 5/2002 | Eisenbacher et al. | 474/18 |
| 6,537,176 B2 * | 3/2003 | Fessler | 477/45 |
| 6,626,777 B1 * | 9/2003 | Gierling | 474/18 |
| 2004/0176198 A1 * | 9/2004 | Nobu | 474/28 |
| 2006/0105868 A1 | 5/2006 | Moorman | |
| 2012/0035009 A1 * | 2/2012 | Mano | 474/28 |

OTHER PUBLICATIONS

Supplementary European Search Report from EP 09849357; Feb. 1, 2013; Luciano Meritano.
B.A. Dmochowski, International Search Report, May 27, 2010, Gatineau, Quebec, Canada.

* cited by examiner

FIG. 12A

CALIBRATION MAP

| TPS (%) | SPEED (km/h) | | | | | | | | | |
|---|---|---|---|---|---|---|---|---|---|---|
| | 0 | 20 | 40 | 60 | 80 | 100 | 120 | 140 | 160 | 180 |
| 0 | 1800 | 1800 | 1850 | 1900 | 2800 | 3500 | 4000 | 4000 | 4000 | 4000 |
| 5 | 1800 | 2000 | 1900 | 1900 | 2800 | 3500 | 4500 | 4000 | 4500 | 4500 |
| 7 | 1800 | 2200 | 2400 | 2800 | 3200 | 4000 | 4800 | 4500 | 5000 | 5000 |
| 10 | 1800 | 2500 | 2600 | 3600 | 4200 | 4800 | 5200 | 5000 | 5500 | 5500 |
| 15 | 1800 | 2500 | 2800 | 4000 | 4300 | 5200 | 5600 | 5500 | 6000 | 6500 |
| 20 | 1800 | 2500 | 3500 | 4500 | 4500 | 5500 | 6500 | 6500 | 6500 | 7000 |
| 25 | 1800 | 3500 | 4000 | 5000 | 5500 | 6000 | 6800 | 7200 | 7200 | 7200 |
| 40 | 1800 | 4000 | 4500 | 6500 | 6800 | 6500 | 7000 | 7500 | 7500 | 7500 |
| 60 | 1800 | 4500 | 5000 | 7000 | 7200 | 7500 | 7500 | 7800 | 7600 | 7700 |
| 100 | 1800 | 5000 | 5500 | 7700 | 7800 | 7800 | 7800 | 7800 | 7800 | 7800 |

FIG. 12B

CALIBRATION MAP

| TPS (%) | SPEED (km/h) | | | | | | | | | |
|---|---|---|---|---|---|---|---|---|---|---|
| | 0 | 20 | 40 | 60 | 80 | 100 | 120 | 140 | 160 | 180 |
| 0 | 2500 | 4000 | 4000 | 4000 | 4000 | 4000 | 4000 | 4000 | 4000 | 4000 |
| 5 | 2500 | 3600 | 4000 | 4300 | 4500 | 4500 | 4500 | 4500 | 4500 | 4500 |
| 7 | 2800 | 3600 | 4000 | 4500 | 4800 | 5000 | 5000 | 5000 | 5000 | 5000 |
| 10 | 3300 | 4000 | 4300 | 4700 | 5000 | 5500 | 5500 | 5500 | 5500 | 5500 |
| 15 | 4000 | 4500 | 4500 | 4900 | 5200 | 6000 | 6500 | 6500 | 6500 | 6000 |
| 20 | 4500 | 5200 | 5500 | 5500 | 5800 | 6500 | 7200 | 7200 | 7200 | 6500 |
| 25 | 5200 | 5800 | 6200 | 6000 | 6800 | 7200 | 7600 | 7600 | 7600 | 7000 |
| 40 | 5500 | 6200 | 6800 | 6500 | 7400 | 7600 | 7750 | 7750 | 7750 | 7500 |
| 60 | 6500 | 6800 | 7200 | 7200 | 7600 | 7700 | 7800 | 7800 | 7800 | 7800 |
| 100 | 7000 | 7500 | 7600 | 7800 | 7800 | 7800 | 7800 | 7800 | 7800 | 7800 |

FIG. 13

ENGINE TORQUE MAP

| TPS (%) | ENGINE RPM | | | | | | | | | | | | |
|---|---|---|---|---|---|---|---|---|---|---|---|---|---|
| | 1500 | 2000 | 3000 | 3500 | 4000 | 4500 | 5000 | 6000 | 7000 | 8000 |
| 0 | 0.0 | 5.0 | 10.0 | 15.0 | 20.0 | 25.0 | 30.0 | 35.0 | 40.0 | 45.0 |
| 5 | 5.0 | 10.0 | 15.0 | 20.0 | 25.0 | 30.0 | 35.0 | 40.0 | 45.0 | 50.0 |
| 7.5 | 10.0 | 15.0 | 20.0 | 25.0 | 30.0 | 35.0 | 40.0 | 45.0 | 50.0 | 55.0 |
| 10 | 20.0 | 25.0 | 30.0 | 35.0 | 40.0 | 45.0 | 50.0 | 55.0 | 60.0 | 65.0 |
| 12.5 | 25.0 | 30.0 | 35.0 | 40.0 | 45.0 | 50.0 | 55.0 | 60.0 | 65.0 | 70.0 |
| 15 | 30.0 | 35.0 | 40.0 | 45.0 | 50.0 | 55.0 | 60.0 | 65.0 | 70.0 | 75.0 |
| 20 | 40.0 | 45.0 | 50.0 | 55.0 | 60.0 | 65.0 | 70.0 | 75.0 | 80.0 | 85.0 |
| 30 | 50.0 | 55.0 | 60.0 | 65.0 | 70.0 | 75.0 | 80.0 | 85.0 | 90.0 | 95.0 |
| 40 | 60.0 | 65.0 | 70.0 | 75.0 | 80.0 | 85.0 | 90.0 | 95.0 | 100.0 | 105.0 |
| 60 | 80.0 | 85.0 | 90.0 | 95.0 | 100.0 | 105.0 | 110.0 | 115.0 | 120.0 | 125.0 |
| 100 | 100.0 | 105.0 | 110.0 | 115.0 | 120.0 | 125.0 | 130.0 | 135.0 | 140.0 | 145.0 |

FIG. 14

CLAMPING FORCE MAP

| RATIO | TORQUE (Nm) | | | | | | | | | | |
|---|---|---|---|---|---|---|---|---|---|---|---|
| | 0 | 10 | 20 | 30 | 40 | 50 | 60 | 70 | 80 | 90 | 100 |
| 0.8 | 500 | 800 | 1100 | 1400 | 1700 | 2000 | 2300 | 2600 | 2900 | 3200 | 3500 |
| 1 | 600 | 900 | 1200 | 1500 | 1800 | 2100 | 2400 | 2700 | 3000 | 3300 | 3600 |
| 1.3 | 700 | 1000 | 1300 | 1600 | 1900 | 2200 | 2500 | 2800 | 3100 | 3400 | 3700 |
| 1.5 | 800 | 1100 | 1400 | 1700 | 2000 | 2300 | 2600 | 2900 | 3200 | 3500 | 3800 |
| 1.7 | 900 | 1200 | 1500 | 1800 | 2100 | 2400 | 2700 | 3000 | 3300 | 3600 | 3900 |
| 2 | 1000 | 1300 | 1600 | 1900 | 2200 | 2500 | 2800 | 3100 | 3400 | 3700 | 4000 |
| 2.25 | 1100 | 1400 | 1700 | 2000 | 2300 | 2600 | 2900 | 3200 | 3500 | 3800 | 4100 |
| 2.5 | 1200 | 1500 | 1800 | 2100 | 2400 | 2700 | 3000 | 3300 | 3600 | 3900 | 4200 |
| 3 | 1300 | 1600 | 1900 | 2200 | 2500 | 2800 | 3100 | 3400 | 3700 | 4000 | 4300 |
| 3.5 | 1400 | 1700 | 2000 | 2300 | 2600 | 2900 | 3200 | 3500 | 3800 | 4100 | 4400 |
| 4 | 1500 | 1800 | 2100 | 2400 | 2700 | 3000 | 3300 | 3600 | 3900 | 4200 | 4500 |

VEHICLE POWERTRAIN HAVING A HYDRAULIC CONTINUOUSLY VARIABLE TRANSMISSION

FIELD OF THE INVENTION

The present invention relates to a vehicle powertrain having a hydraulic continuously variable transmission.

BACKGROUND OF THE INVENTION

Conventional snowmobile drive trains incorporate a continuously variable transmission (CVT) having a driving pulley that is operatively coupled to the engine crankshaft and a driven pulley coupled to a driven shaft. The driving pulley acts as a clutch and includes a centrifugally actuated adjusting mechanism through which the drive ratio of the CVT is varied progressively as a function of the engine speed and the output torque at the driven pulley. Typically, the driven shaft is a transverse jackshaft which drives the input member of a chain and sprocket reduction drive. The output of reduction drive is coupled to one end of the axle on which are located the drive track drive sprocket wheels.

Although a centrifugal CVT provides many advantages, the fact that the drive ratio of the CVT is directly related to the engine speed causes some disadvantages. One such disadvantage is that the calibration of the driving pulley is always linked with the maximum power output of the engine. Although this results in great acceleration characteristics for the snowmobile, when the snowmobile operates at cruising speeds it results in the engine operating at a greater speed than necessary, high fuel consumption, high noise levels, and a lot of vibrations being transmitted to the riders of the snowmobile.

Therefore, there is a need for a CVT having a drive ratio which is not directly related to the engine speed.

SUMMARY OF THE INVENTION

It is an object of the present invention to ameliorate at least some of the inconveniences present in the prior art.

It is also an object of the present invention to provide a powertrain for a vehicle having a hydraulic CVT with hydraulic fluid being supplied to the driving pulley of the CVT from a hydraulic fluid reservoir via a passage in a driving shaft on which the driving pulley is disposed.

In one aspect, the invention provides a vehicle powertrain having an engine, a driving shaft extending from the engine and being driven by the engine, the driving shaft having a passage defined therein, a driven shaft operatively connected to the driving shaft, a pump fluidly communicating with the passage, a hydraulic fluid reservoir fluidly communicating with the pump, and a continuously variable transmission operatively connecting the driving shaft with the driven shaft. The continuously variable transmission includes a driving pulley disposed on the driving shaft for rotation therewith, a driven pulley disposed on the driven shaft for rotation therewith, and a belt operatively connecting the driving pulley with the driven pulley. The driving pulley includes a fixed sheave disposed on the driving shaft for rotation therewith, a movable sheave disposed on the driving shaft for rotation therewith, the belt being disposed between the fixed sheave and the movable sheave, a spring biasing the movable sheave away from the fixed sheave, and a CVT chamber fluidly communicating with the passage of the driving shaft. The pump supplies hydraulic fluid from the reservoir to the passage in the driving shaft. The hydraulic fluid flows from the passage to the CVT chamber to create a hydraulic pressure in the CVT chamber. The hydraulic pressure in the CVT chamber biases the movable sheave toward the fixed sheave.

In a further aspect, the passage in the driving shaft includes an axial passage extending axially in the driving shaft, and at least one inlet passage extending radially from the axial passage to an outer surface of the driving shaft. The at least one inlet passage fluidly communicates the axial passage with the pump. The axial passage fluidly communicates the at least one inlet passage with the CVT chamber.

In an additional aspect, the driving shaft is a crankshaft of the engine.

In a further aspect, the pump is mechanically driven by the engine.

In an additional aspect, the reservoir is a first reservoir. The powertrain also has a second hydraulic fluid reservoir. The pump supplies hydraulic fluid from the first reservoir to the second reservoir. The hydraulic fluid flows from the second reservoir to the passage in the driving shaft.

In a further aspect, the second reservoir surrounds the driving shaft and the first reservoir surrounds the second reservoir.

In an additional aspect, a pressure release valve selectively fluidly communicates the second reservoir with the first reservoir.

In a further aspect, a proportional pressure relief valve selectively fluidly communicates the second reservoir with the first reservoir for controlling the hydraulic pressure in the CVT chamber. A proportional pressure relief valve chamber is disposed adjacent an end of the proportional pressure relief valve. A position of the proportional pressure relief valve is determined at least in part by a hydraulic fluid pressure in the proportional pressure relief valve chamber. The hydraulic pressure in the proportional pressure relief valve chamber biases the proportional pressure relief valve toward a closed position preventing the flow of hydraulic fluid from the second reservoir to the first reservoir.

In an additional aspect, a spring is disposed in the proportional pressure relief valve chamber. The spring biases the proportional pressure relief valve toward the closed position.

In a further aspect, a proportional pressure relief valve passage fluidly communicates with the proportional pressure relief valve chamber. The proportional pressure relief valve passage supplies hydraulic fluid to the proportional pressure relief valve chamber via a first opening fluidly communicating the proportional pressure relief valve passage with the second reservoir. An electronically controlled pilot valve controls fluid communication between the proportional pressure relief valve passage and the first reservoir via a second opening for controlling the hydraulic pressure in the proportional pressure relief valve chamber. A diameter of the first opening is smaller than a diameter of the second opening.

In an additional aspect, an end of the proportional pressure relief valve opposite the end of the proportional pressure relief valve adjacent the proportional pressure relief valve chamber is bell-shaped. The bell-shaped end extends in the second reservoir. Hydraulic pressure on the bell-shaped end biases the proportional pressure relief valve toward an opened position allowing the flow of hydraulic fluid from the second reservoir to the first reservoir.

In a further aspect, the engine has an engine casing. The reservoir is formed between the engine casing and a cover connected to the engine casing.

In an additional aspect, when removing the belt from the continuously variable transmission, the belt is moved over the movable sheave in a direction away from the engine.

In another aspect, the invention provides a vehicle powertrain having an engine. The engine has an engine casing, and a crankshaft extending through a portion of the engine casing. The crankshaft has a passage defined therein. The powertrain also has a continuously variable transmission driving pulley disposed on the crankshaft for rotation therewith. The driving pulley includes a fixed sheave disposed on the crankshaft for rotation therewith, a movable sheave operatively connected with the fixed sheave, a spring biasing the movable sheave away from the fixed sheave, and a CVT chamber fluidly communicating with the passage of the crankshaft. A hydraulic fluid reservoir disposed between the portion of the engine casing and the fixed sheave. The reservoir fluidly communicates with the passage of the crankshaft. A pump fluidly communicates with the reservoir. The pump supplies hydraulic fluid from the reservoir to the passage in the crankshaft. The hydraulic fluid flows from the passage to the CVT chamber to create a hydraulic pressure in the CVT chamber. The hydraulic pressure in the CVT chamber biases the movable sheave toward the fixed sheave.

In an additional aspect, the passage in the crankshaft includes an axial passage extending axially in the crankshaft, and at least one inlet passage extending radially from the axial passage to an outer surface of the crankshaft. The at least one inlet passage fluidly communicates the axial passage with the pump. The axial passage fluidly communicates the at least one inlet passage with the CVT chamber.

In a further aspect, the reservoir is a first reservoir. The powertrain also has a second hydraulic fluid reservoir. The pump supplies hydraulic fluid from the first reservoir to the second reservoir. The hydraulic fluid flows from the second reservoir to the passage in the crankshaft.

In an additional aspect, a proportional pressure relief valve selectively fluidly communicates the second reservoir with the first reservoir for controlling the hydraulic pressure in the CVT chamber. A proportional pressure relief valve chamber is disposed adjacent an end of the proportional pressure relief valve. A position of the proportional pressure relief valve is determined at least in part by a hydraulic fluid pressure in the proportional pressure relief valve chamber. The hydraulic pressure in the proportional pressure relief valve chamber biases the proportional pressure relief valve toward a closed position preventing the flow of hydraulic fluid from the second reservoir to the first reservoir.

In a further aspect, a spring is disposed in the proportional pressure relief valve chamber. The spring biases the proportional pressure relief valve toward the closed position.

In an additional aspect, a proportional pressure relief valve passage fluidly communicates with the proportional pressure relief valve chamber. The proportional pressure relief valve passage supplies hydraulic fluid to the proportional pressure relief valve chamber via a first opening fluidly communicating the proportional pressure relief valve passage with the second reservoir. An electronically controlled pilot valve controls fluid communication between the proportional pressure relief valve passage and the first reservoir via a second opening for controlling the hydraulic pressure in the proportional pressure relief valve chamber. A diameter of the first opening is smaller than a diameter of the second opening.

In a further aspect, an end of the proportional pressure relief valve opposite the end of the proportional pressure relief valve adjacent the proportional pressure relief valve chamber is bell-shaped. The bell-shaped end extends in the second reservoir. Hydraulic pressure on the bell-shaped end biases the proportional pressure relief valve toward an opened position allowing the flow of hydraulic fluid from the second reservoir to the first reservoir.

In an additional aspect, the reservoir is formed between the portion of the engine casing and a cover connected to the engine casing.

For purposes of this application, the terms related to spatial orientation such as forwardly, rearwardly, left and right, are as they would normally be understood by a driver of a vehicle sitting thereon in a normal driving position.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 12A is an example of a calibration map used in the method of controlling the CVT;

FIG. 12B is an example of another calibration map used in the method of controlling the CVT;

FIG. 13 is an example of an engine torque map used in the method of controlling the CVT; and FIG. 14 is an example of a clamping force map used in the method of controlling the CVT.

DETAILED DESCRIPTION OF THE PREFERRED EMBODIMENTS

The present invention will be described with respect to a snowmobile. However, it is contemplated that the invention could be used in other vehicles, such as, but not limited to, a motorcycle, a three-wheel vehicle and an all-terrain vehicle (ATV).

Figure 1:
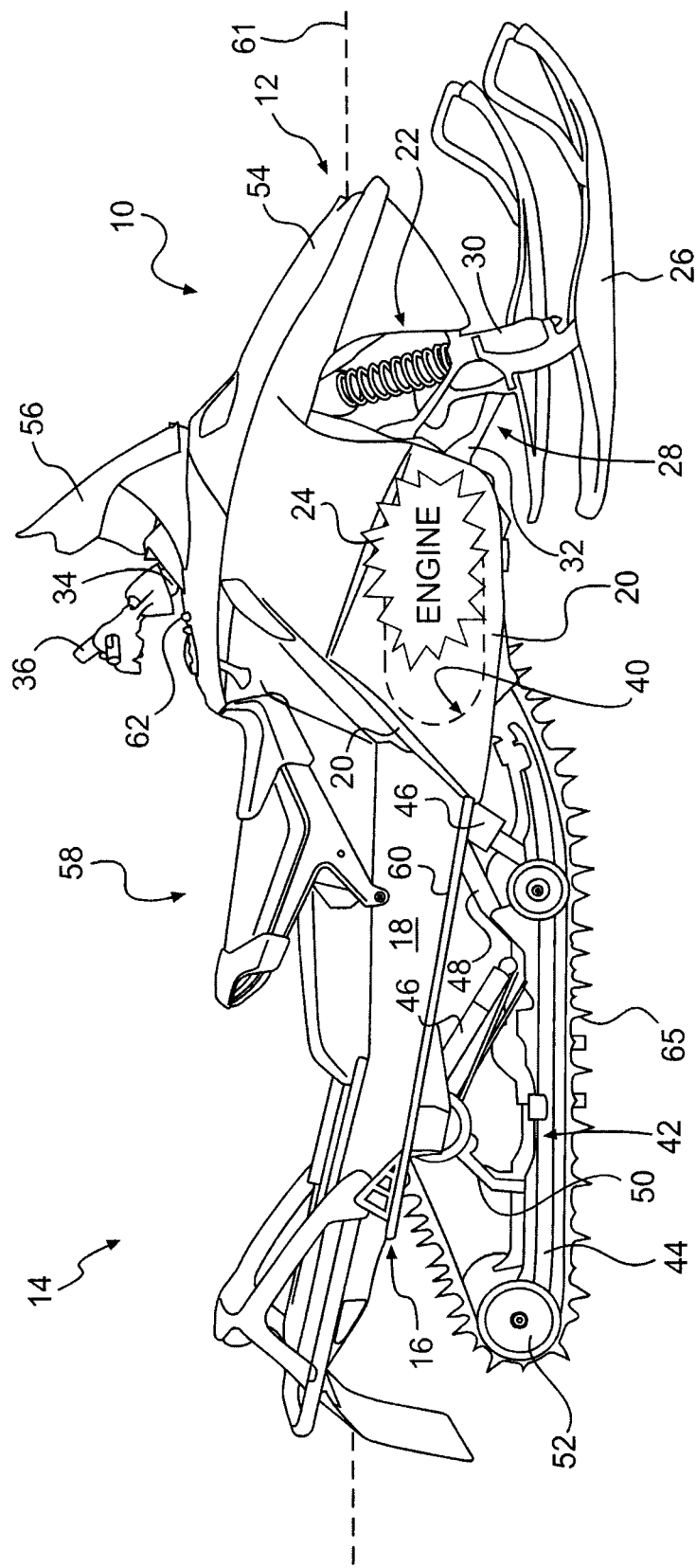
FIG. 1 is a right side elevation view of a snowmobile.
Figure 2:
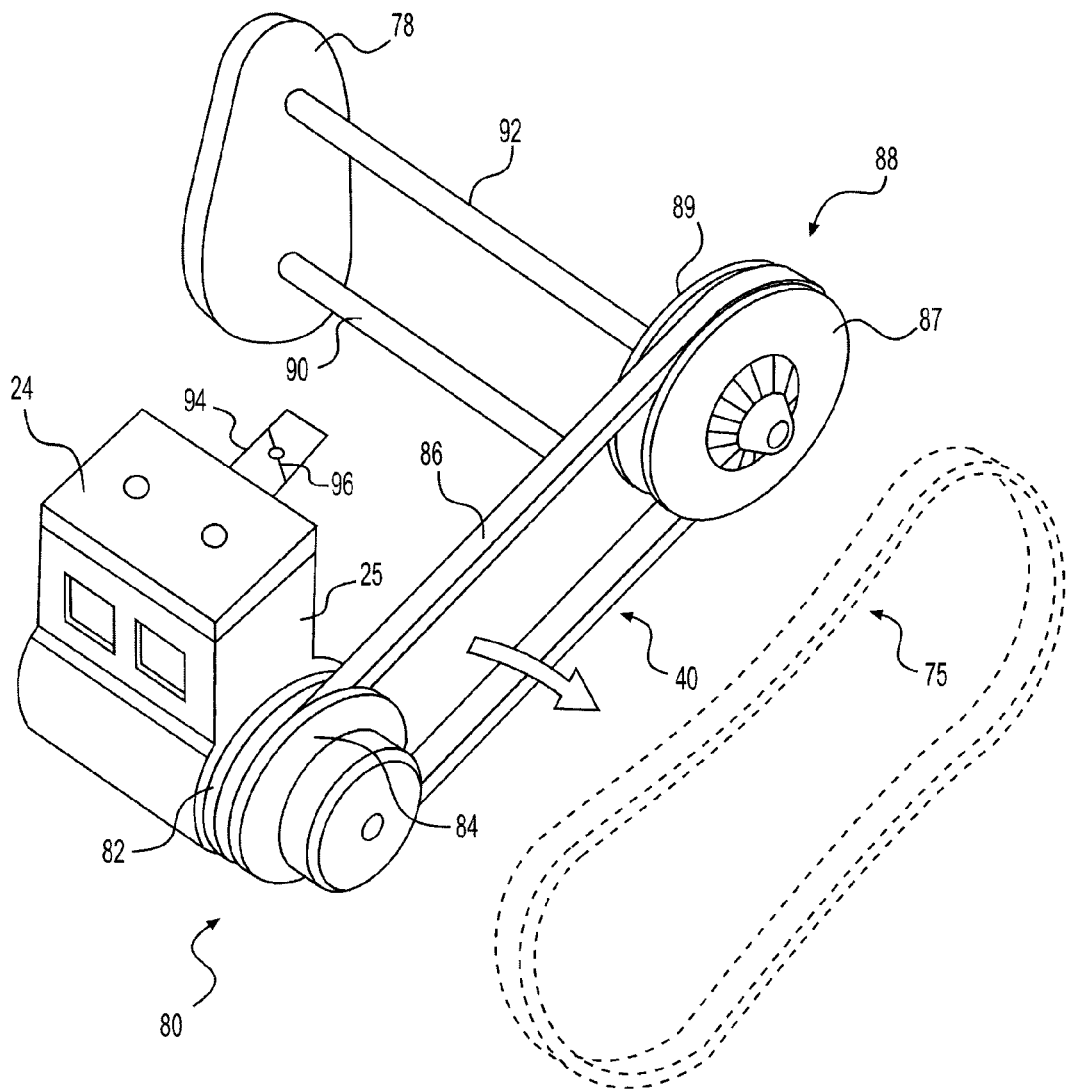
FIG. 2 is a perspective view, taken from a front, left side, of a powertrain of the snowmobile of FIG. 1.

Turning now to FIG. 1, a snowmobile 10 includes a forward end 12 and a rearward end 14 which are defined consistently with a forward travel direction of the vehicle. The snowmobile 10 includes a frame 16 which normally includes a tunnel 18, an engine cradle portion 20 and a front suspension assembly portion 22. The tunnel 18 generally consists of sheet metal bent in an inverted U-shape which extends rearwardly along the longitudinal axis 61 of the snowmobile 10 and is connected at the front to the engine cradle portion 20. An engine 24, which is schematically illustrated in FIG. 1, is carried by the engine cradle portion 20 of the frame 16. The engine 24 has an engine casing 25 (FIG. 2). The engine casing 25 consists of various parts fastened or otherwise connected to each other. A steering assembly is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively connecting the respective skis 26 to a steering column 34. A steering device such as a handlebar 36, positioned forward of a rider, is attached to the upper end of the steering column 34 to allow the rider to rotate the ski legs 30 and thus the skis 26, in order to steer the snowmobile 10.

An endless drive track 65 is positioned at the rear end 14 of the snowmobile 10. The drive track 65 is disposed generally under the tunnel 18, and is operatively connected to the engine 24 through CVT 40 illustrated schematically by broken lines and which will be described in greater detail below. The endless drive track 65 is driven to run about a rear suspension assembly 42 for propulsion of the snowmobile 10. The rear suspension assembly 42 includes a pair of slide rails 44 in sliding contact with the endless drive track 65. The rear suspension assembly 42 also includes one or more shock absorbers 46 which may further include coil springs (not shown) surrounding the shock absorbers 46. Suspension arms 48 and 50 are provided to attach the slide rails 44 to the frame 16. One or more idler wheels 52 are also provided in the rear suspension assembly 42.

At the front end 12 of the snowmobile 10, fairings 54 enclose the engine 24 and the CVT 40, thereby providing an external shell that protects the engine 24 and the CVT 40, and can also be decorated to make the snowmobile 10 more aesthetically pleasing. The fairings 54 include a hood and one or more side panels which can be opened to allow access to the engine 24 and the CVT 40 when this is required, for example, for inspection or maintenance of the engine 24 and/or the CVT 40. In the particular snowmobile 10 shown in FIG. 1, the side panels can be opened along a vertical axis to swing away from the snowmobile 10. A windshield 56 is connected to the fairings 54 near the front end 12 of the snowmobile 10 or alternatively directly to the handlebar 36. The windshield 56 acts as a wind screen to lessen the force of the air on the rider while the snowmobile 10 is moving.

The engine 24 is an internal combustion engine that is supported on the frame 16 and is located at the engine cradle portion 20. The internal construction of the engine 24 may be of any known type and can operate on the two-stroke or four-stroke principle. The engine 24 drives a crankshaft 57 (FIG. 4) that rotates about a horizontally disposed axis that extends generally transversely to the longitudinal axis 61 of the snowmobile 10. The crankshaft 57 drives the CVT 40 for transmitting torque to the endless drive track 65 for propulsion of the snowmobile 10 as described in greater detail below.

A straddle-type seat 58 is positioned atop the frame 16. A rear portion of the seat 58 may include a storage compartment or can be used to accommodate a passenger seat. Two footrests 60 are positioned on opposite sides of the snowmobile 10 below the seat 58 to accommodate the driver's feet.

FIG. 2 illustrates schematically a powertrain 75 of the snowmobile 10. The powertrain 75 includes the engine 24, the CVT 40 and a fixed ratio reduction drive 78. A throttle body 94 having a throttle valve 96 therein is connected to air intake ports of the engine 24 to control the flow of air to the engine 24. It is contemplated that the throttle body 94 could be replaced by a carburetor. The CVT 40 includes a driving pulley 80 coupled, directly or indirectly, to rotate with the crankshaft 57 of the engine 24 and a driven pulley 88 coupled to one end of a transversely mounted jackshaft 92 which is supported on the frame 16 through bearings. As illustrated, the transversely mounted jackshaft 92 traverses the width of the engine 24. The opposite end of the transversely mounted jackshaft 92 is connected to the input member of the reduction drive 78 and the output member of the reduction drive 78 is connected to a drive axle 90 carrying sprocket wheels (not shown) that form a driving connection with the drive track 65.

The driving pulley 80 of the CVT 40 includes a pair of opposed frustoconical belt drive sheaves 82 and 84 between which the drive belt 86 is located. The drive belt is preferably made of rubber. The driving pulley 80 will be described in greater detail below. The driven pulley 88 includes a pair of frustoconical belt drive sheaves 87 and 89 between which the drive belt 86 is located. The driving pulley 80 engages the drive belt 86. The torque being transmitted to the driven pulley 88 provides the necessary clamping force on the belt 86 through its torque sensitive mechanical device in order to efficiently transfer torque to the further powertrain components. The effective diameters of the driving pulley 80 and the driven pulley 88 are the result of the equilibrium of forces on the drive belt 86 from the hydraulic system of the driving pulley 80 and the torque sensitive mechanism of the driven pulley 88.

In this particular example, the driving pulley 80 rotates at the same speed as the crankshaft 57 of the engine 24 whereas the speed of rotation of the transverse jackshaft 92 is determined in accordance with the instantaneous ratio of the CVT 40, and the drive axle 90 rotates at a lower speed than the transverse jackshaft 92 because of the action of the reduction drive 78. Typically, the input member of the reduction drive 78 consists of a small sprocket connected to the transverse jackshaft 92 and coupled to drive an output member consisting of a larger sprocket connected to the drive axle 90 through a driving chain, all enclosed within the housing of the reduction drive 78.

It is contemplated that the driving pulley 80 could be coupled to an engine shaft other than the crankshaft 57, such as an output shaft, a counterbalance shaft, or a power take-off shaft driven by and extending from the engine 24. The shaft driving the driving pulley 80 is therefore generally referred to as the driving shaft. Although the present embodiment is being described with the crankshaft 57 being the driving shaft, it should be understood that other shafts are contemplated. Similarly, it is contemplated that the driven pulley 88 could be coupled to a shaft other than the transverse jackshaft 92, such as directly to the drive axle 90 or any other shaft operatively connected to the ground engaging element of the vehicle (i.e. the drive track 65 in the case of the snowmobile 10). The shaft driven by the driven pulley 88 is therefore generally referred to as the driven shaft. Although the present embodiment is being described with the transverse jackshaft 92 being the driven shaft, it should be understood that other shafts are contemplated.

Figure 3A:
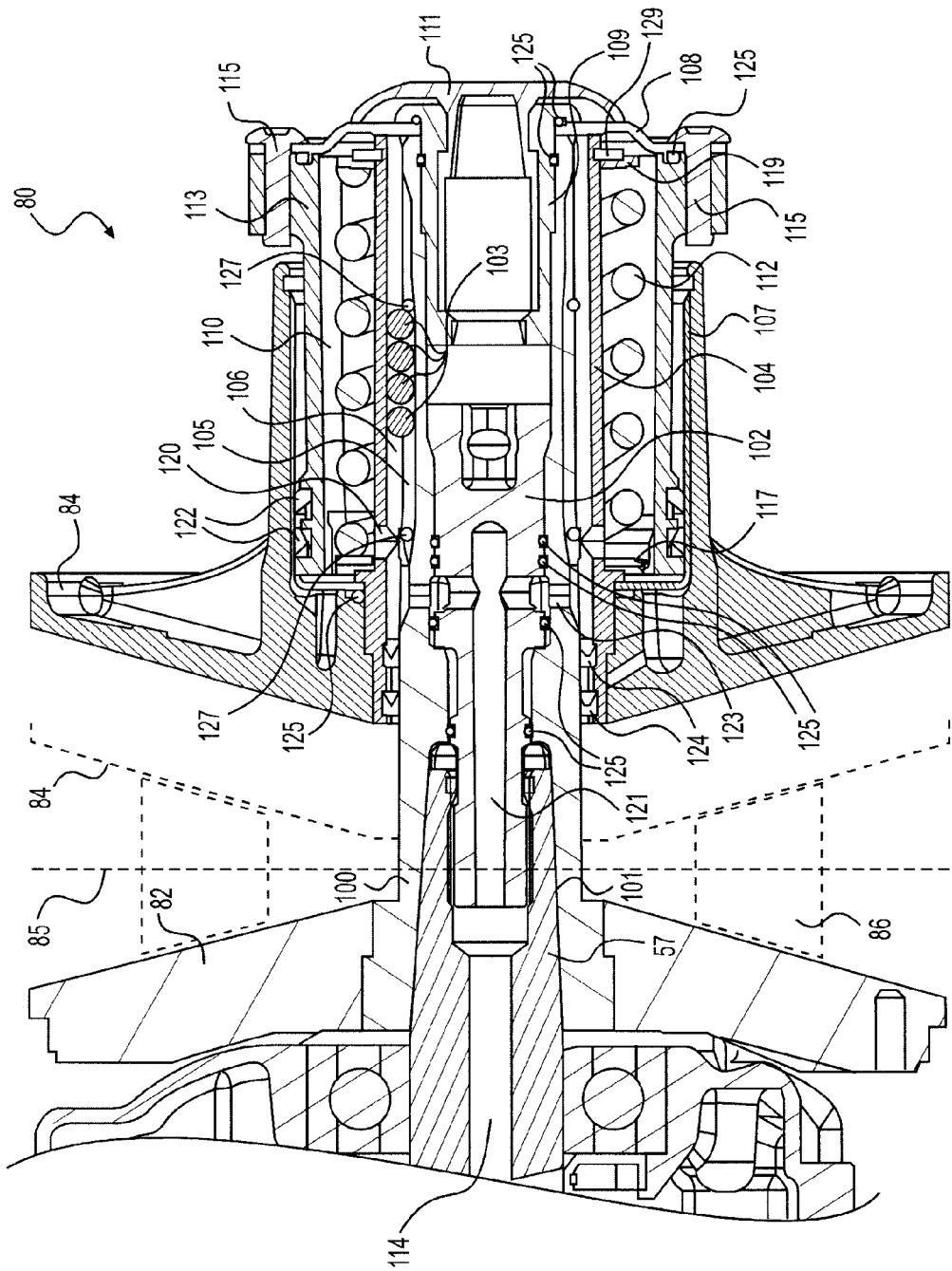
FIG. 3A is a cross-sectional view of a driving pulley of a CVT of the powertrain of FIG. 2.
Figure 3B:
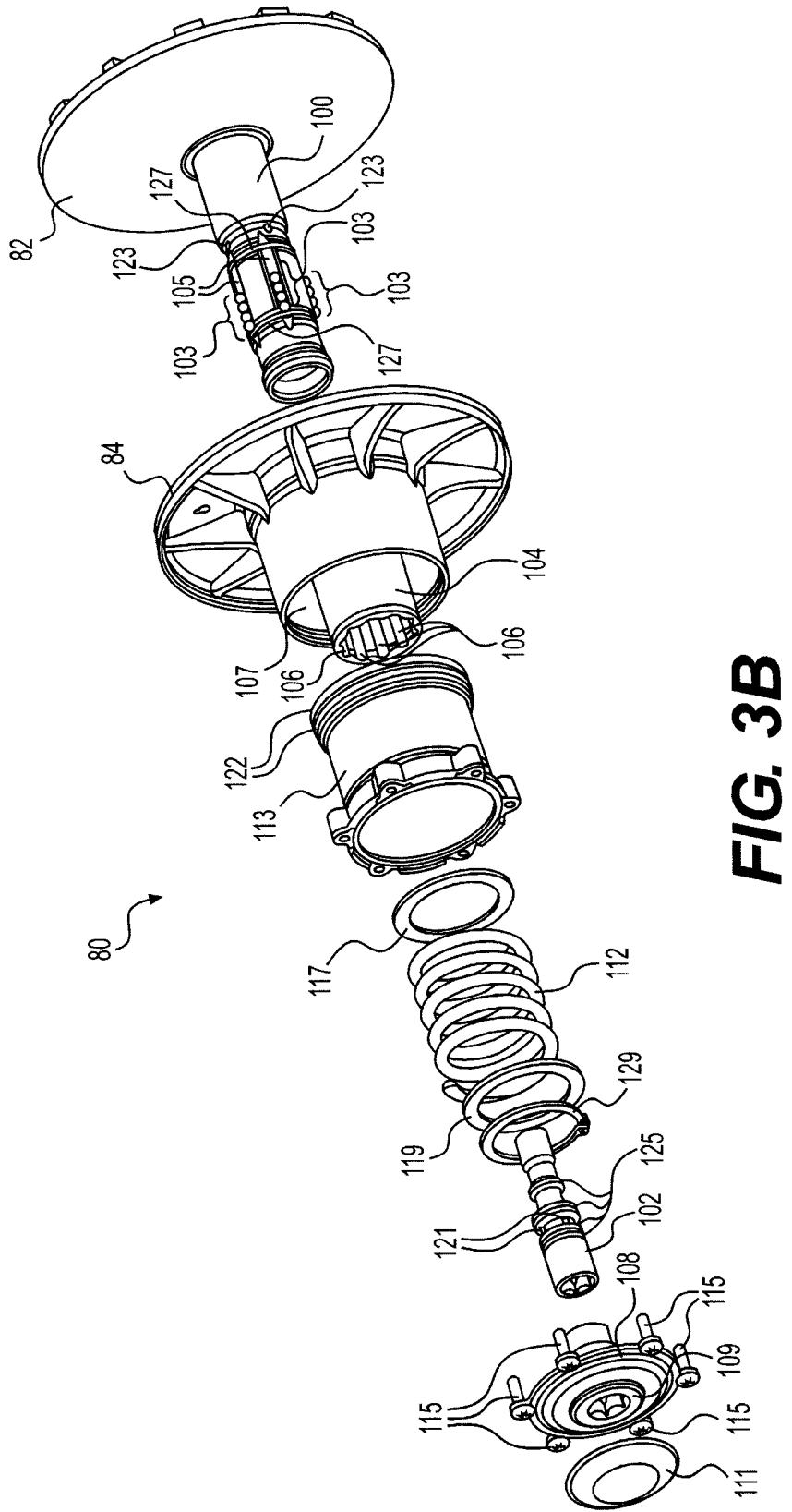
FIG. 3B is an exploded view of the driving pulley of FIG. 3A.

Turning now to FIGS. 3A and 3B, the driving pulley 80 will be described in more detail. As discussed above, the driving pulley 80 includes a pair of opposed frustoconical belt drive sheaves 82 and 84. Both sheaves 82 and 84 rotate together with the crankshaft 57. The sheave 82 is fixed in an axial direction of the crankshaft 57, and is therefore referred to as the fixed sheave 82. The sheave 84 can move toward or away from the fixed sheave 82 in the axial direction of the crankshaft 57 in order to change the drive ratio of the CVT 40, and is therefore referred to as the movable sheave 84. As can be seen in FIG. 2, the fixed sheave 82 is disposed between the movable sheave 84 and the engine 24, however it is contemplated that the movable sheave 84 could be disposed between the fixed sheave 82 and the engine 24.

The fixed sheave 82 is mounted on a shaft 100. A portion 101 of the shaft 100 is taper-fitted on the end of the crankshaft 57 such that the shaft 100 and the fixed sheave 82 rotate with the crankshaft 57. It is contemplated that the shaft 100 could be connected to the crankshaft 57 in other known manners. For example, the shaft 100 could engage the crankshaft 57 via splines. A bolt 102 inserted inside the shaft 100 is screwed inside the end of the crankshaft 57, thus retaining the shaft 100, and therefore the fixed sheave 82, on the crankshaft 57. A sleeve 104 is disposed around the shaft 100. Ball bearings 103 are disposed in axial grooves 105, 106 in the outer surface of the shaft 100 and the inner surface of the sleeve 104 respectively. The ball bearings 103 transfer torque from the shaft 100 to the sleeve 104 such that the sleeve 104 rotates with the shaft 100 while permitting axial movement of the sleeve 104 relative to the shaft 100. Retaining rings 127 disposed on the shaft 100 limit the movement of the ball bearings 103 inside the grooves 105, 106. The movable sheave 84 is mounted on the sleeve 104 such that the movable sheave 84 rotates and moves axially with the sleeve 104, and therefore rotates with the shaft 100 and the crankshaft 57. A sleeve 107 is press-fit inside the movable sheave 84. It is contemplated that the sleeve 107 could be omitted.

An annular cover 108 is retained between the end of the shaft 100 and a flanged head of a bolt 109 so as to rotate with the shaft 100. The bolt 109 is screwed inside the end of the shaft 100. A cap 111 is clipped in the end of the bolt 109. A sleeve 113 is connected to the annular cover 108 by screws 115 and is received axially between portions of the movable sheave 84 and of the sleeve 104.

A CVT chamber 110 is defined between the annular cover 108 and the sleeves 104, 107, and 113. The CVT chamber 110 has an annular cross-section. An inner wall of the CVT chamber 110 is formed by the sleeve 104, an outer wall of the CVT chamber 110 is formed by the sleeve 113, an outer end of the CVT chamber 110 is formed by the annular cover 108, and an inner end of the CVT chamber is formed by the sleeve 107 (or the movable sheave 84 should the sleeve 107 be omitted). A helical spring 112 is disposed inside the CVT chamber 110. One end of the spring 112 abuts a ring 117 abutting the sleeve 113 which is axially fixed relative to the crankshaft 57. The other end of the spring 112 abuts a ring 119 which abuts a clip 129 connected to the sleeve 104 which is axially movable relative to the crankshaft 57. This arrangement of the spring 112 causes the spring 112 to bias the movable sheave 84 away from the fixed sheave 82.

Figure 5:
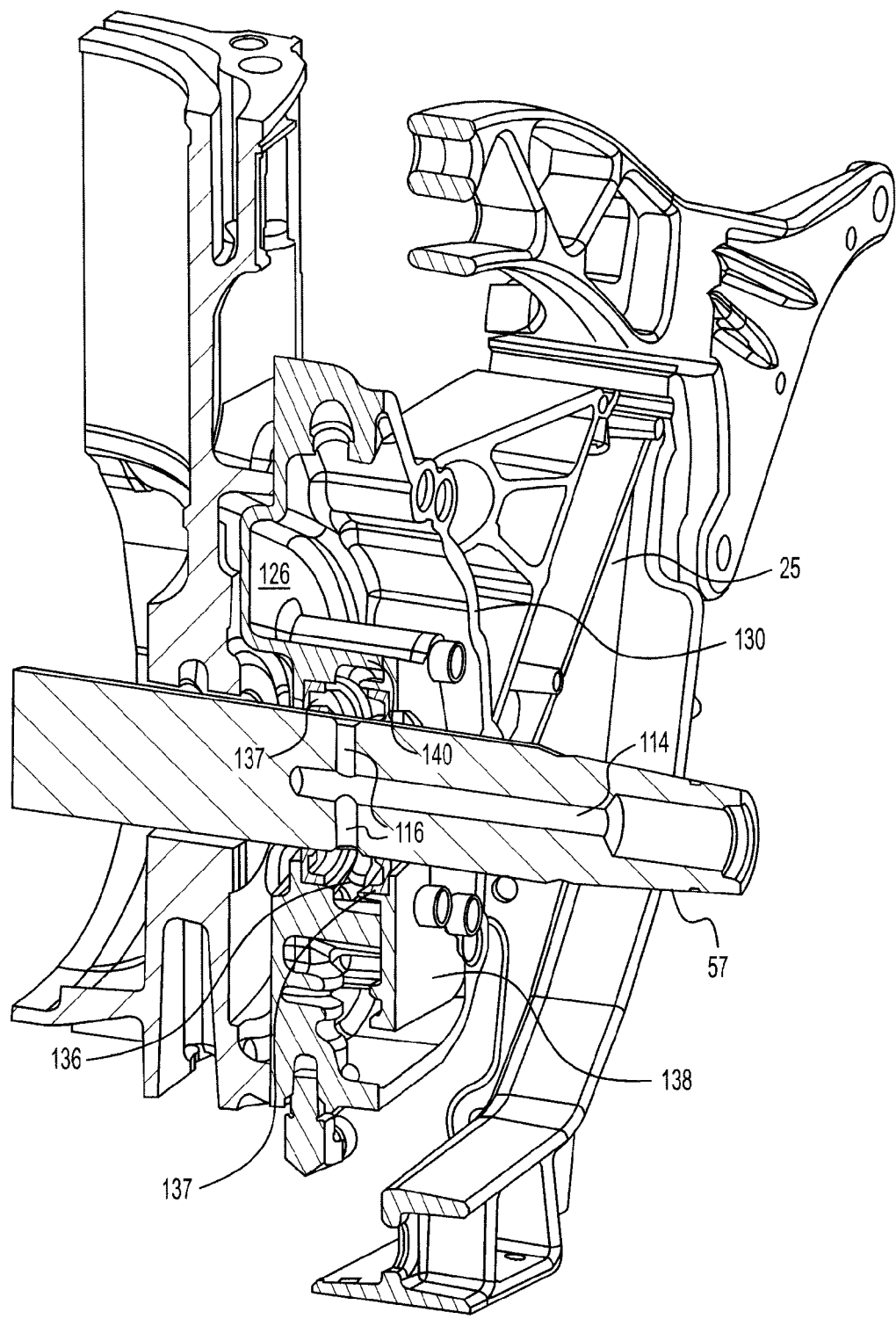
FIG. 5 is a cross-sectional view of the portion of the casing of FIG. 4 taken through line 5-5 of FIG. 4.

As will be explained in greater detail below, hydraulic pressure created by hydraulic fluid supplied to the CVT chamber 110 biases the movable sheave 84 toward the fixed sheave 82 in order to change the drive ratio of the CVT 40. As can be seen in FIG. 5, the crankshaft 57 has an axial passage 114 extending axially therein and two inlet passages 116 extending radially from the axial passage 114 to the outer surface of the crankshaft 57. Although shown as extending perpendicularly and radially from the axial passage 114, it is contemplated that the inlet passages 116 could extend radially at some other angle from the axial passage 114. It is also contemplated that more than two inlet passages 116 or only one inlet passage 116 could be provided. As explained below, a pump 118 (FIG. 6) supplies hydraulic fluid, such as oil for example, to the axial passage 114 of the crankshaft 57 via the inlet passages 116. Returning now to FIG. 3A, from the axial passage 114, the hydraulic fluid flows in a passage 121 defined in the bolt 102. The passage 121 has an axial portion and multiple radially extending outlets. As can be seen in FIG. 3A, when the movable sheave 84 is biased toward the fixed sheave 82 (as illustrated by the movable sheave 84 shown schematically in dotted lines in this figure), a plane 85 passing through a center of the belt 86 intersects the passages 121 and 114 and is disposed laterally between the inlet passages 116 of the crankshaft 57 and the radially extending outlets of the passage 121 of the bolt 102. The hydraulic fluid then flows through passages 123 in the shaft 100, through grooves 105, 106 and through passages 120 in the sleeve 104 into the CVT chamber 110. As the hydraulic pressure increases inside the CVT chamber 110, the movable sheave 84 moves axially toward the fixed sheave 82. When the hydraulic pressure inside the CVT chamber 110 is reduced, as will be described below, the bias of the spring 112 causes the movable sheave 84 to move axially away from the fixed sheave 82 and the hydraulic fluid flows out of the CVT chamber 110 in the direction opposite to what has been described above.

Seals 122 disposed between the sleeve 113 and the sleeve 107, seals 124 disposed between the shaft 100 and the sleeve 104, and various O-rings 125 prevent hydraulic fluid from leaking out of the driving pulley 80.

By having the hydraulic fluid supplied to the CVT chamber 110 via a driving shaft extending from the engine 24, the belt 86 can easily be removed from the pulleys 80, 88 for maintenance or replacement since no portion of the hydraulic system of the CVT 40 extends on a side of the CVT 40 opposite the side on which the engine 24 is disposed (i.e. the belt 86 is removed over the movable sheave 84 from a side of the driving pulley 84 opposite the side from which hydraulic fluid enters the driving pulley 84).

Turning now to FIGS. 4 to 8, the hydraulic system supplying hydraulic fluid to the CVT chamber 110 will be described. Although the system will be described with respect to these figures, for simplicity of understanding, reference can be made to FIG. 9 which provides a diagrammatic representation of the hydraulic system.

Figure 4:
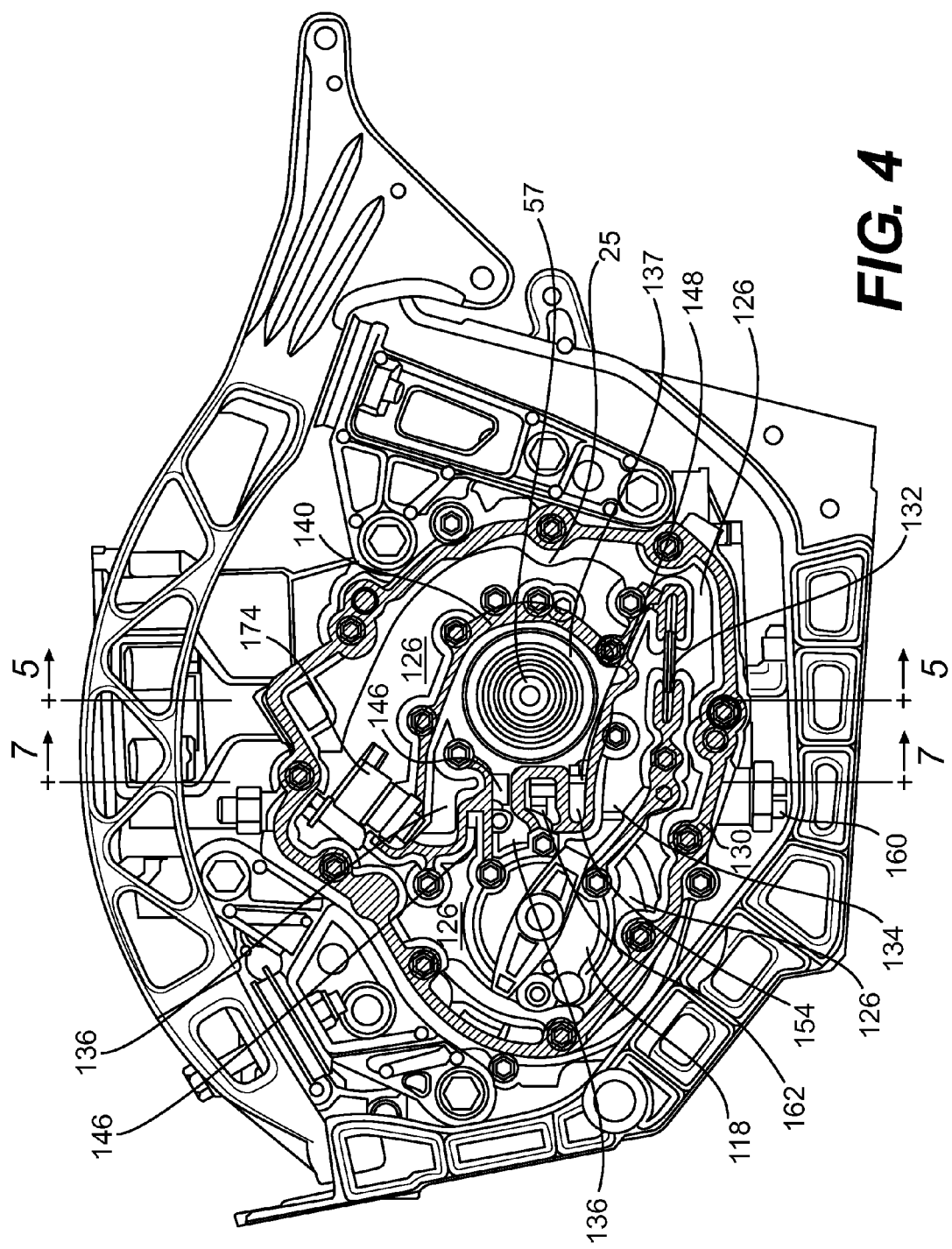
FIG. 4 is an elevation view of a portion of the casing of an engine of the powertrain of FIG. 2 showing elements of a hydraulic system of the CVT.
Figure 6:
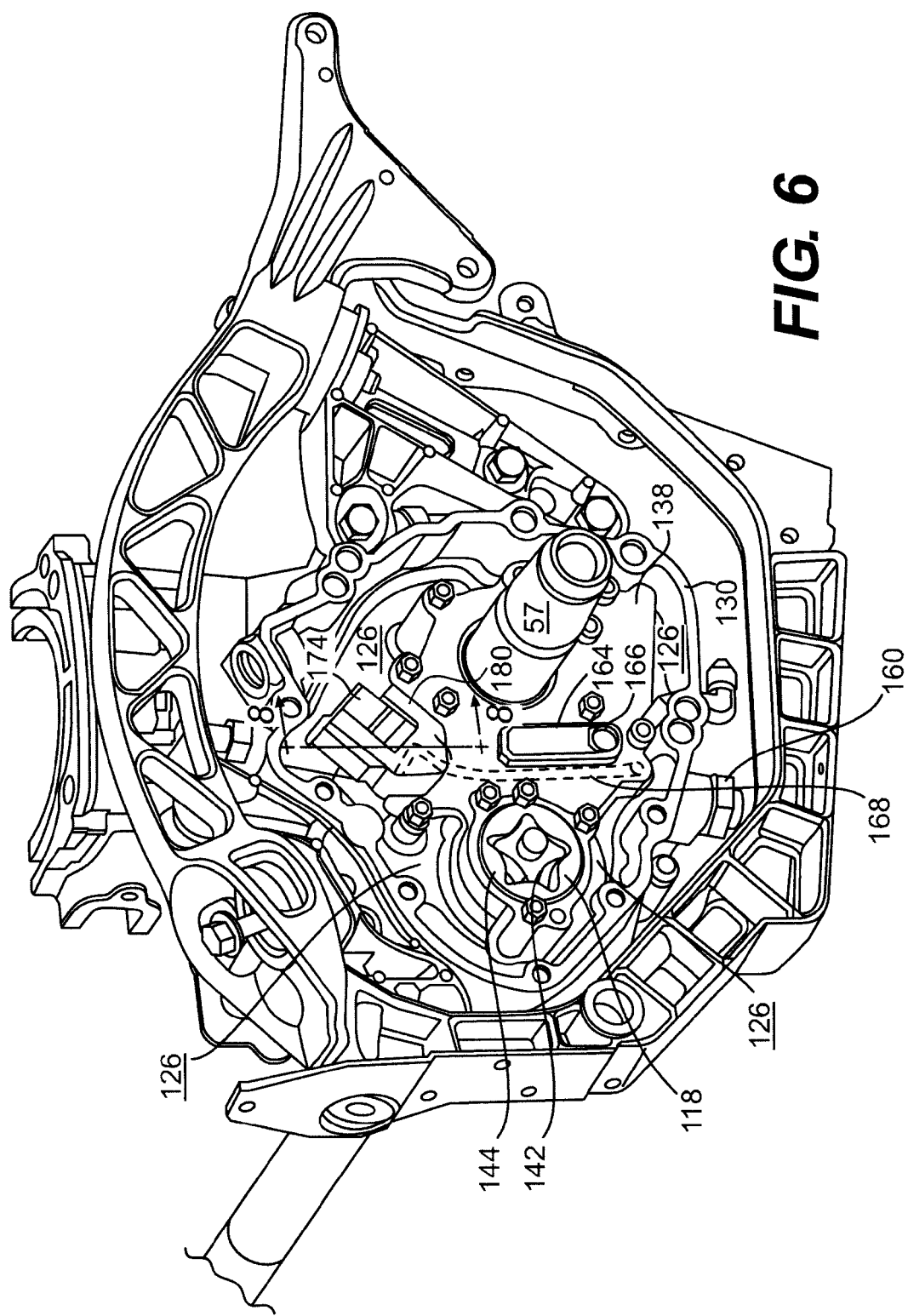
FIG. 6 is a perspective view of the portion of the casing of FIG. 4 with an inner reservoir cover mounted to the casing.

The hydraulic system has a first reservoir 126 for holding the hydraulic fluid. The first reservoir 126 is formed between the engine casing 25 and a cover 128 (FIG. 7) sealingly connected to a protruding lip 130 of the engine casing 25. The portion of the engine casing 25 forming the first reservoir 126 is fastened to other portions of the engine casing 25. However it is contemplated that it could be integrally formed with another portion of the engine casing 25, such as the crankcase for example. From the first reservoir 126, the hydraulic fluid flows through a filter 132 located near a bottom of the first reservoir 126 and then flows in a passage 134. From the passage 134, the hydraulic fluid enters the pump 118 and flows out of the pump 118 into a second reservoir (or canal) 136. The second reservoir 136 is formed between the engine casing 25 and a cover 138 (best seen in FIG. 6) sealingly connected to a protruding lip 140 of the engine casing 25. As best seen in FIG. 4, the second reservoir 136 surrounds the crankshaft 57, and the first reservoir 126 surrounds the second reservoir 136. Seals 137 are disposed around the crankshaft 57 on either side of the inlet passages 116 (see FIG. 5). The pump 118 is preferably a gerotor pump driven by the engine 24. As seen in FIG. 6, the gerotor pump consists of an inner rotor 142 disposed off-center from an outer rotor 144, with both rotors 142, 144 rotating when the pump 118 is in operation. It is contemplated that other types of pumps could be used. It is also contemplated that the pump could be driven separately from the engine 24, such as by an electric motor for example. While the pump 118 is operating, the hydraulic pressure inside the second reservoir 136 is normally greater than in the first reservoir 126. A pressure release valve 146 is disposed in a passage in the protruding lip 140 so as to fluidly communicate the second reservoir 136 with the first reservoir 126 should the hydraulic pressure inside the second reservoir 136 become too high. From the second reservoir 136, the hydraulic fluid flows to the inlet passages 116 of the crankshaft 57 and then to the CVT chamber 110 as described above.

Figure 7:
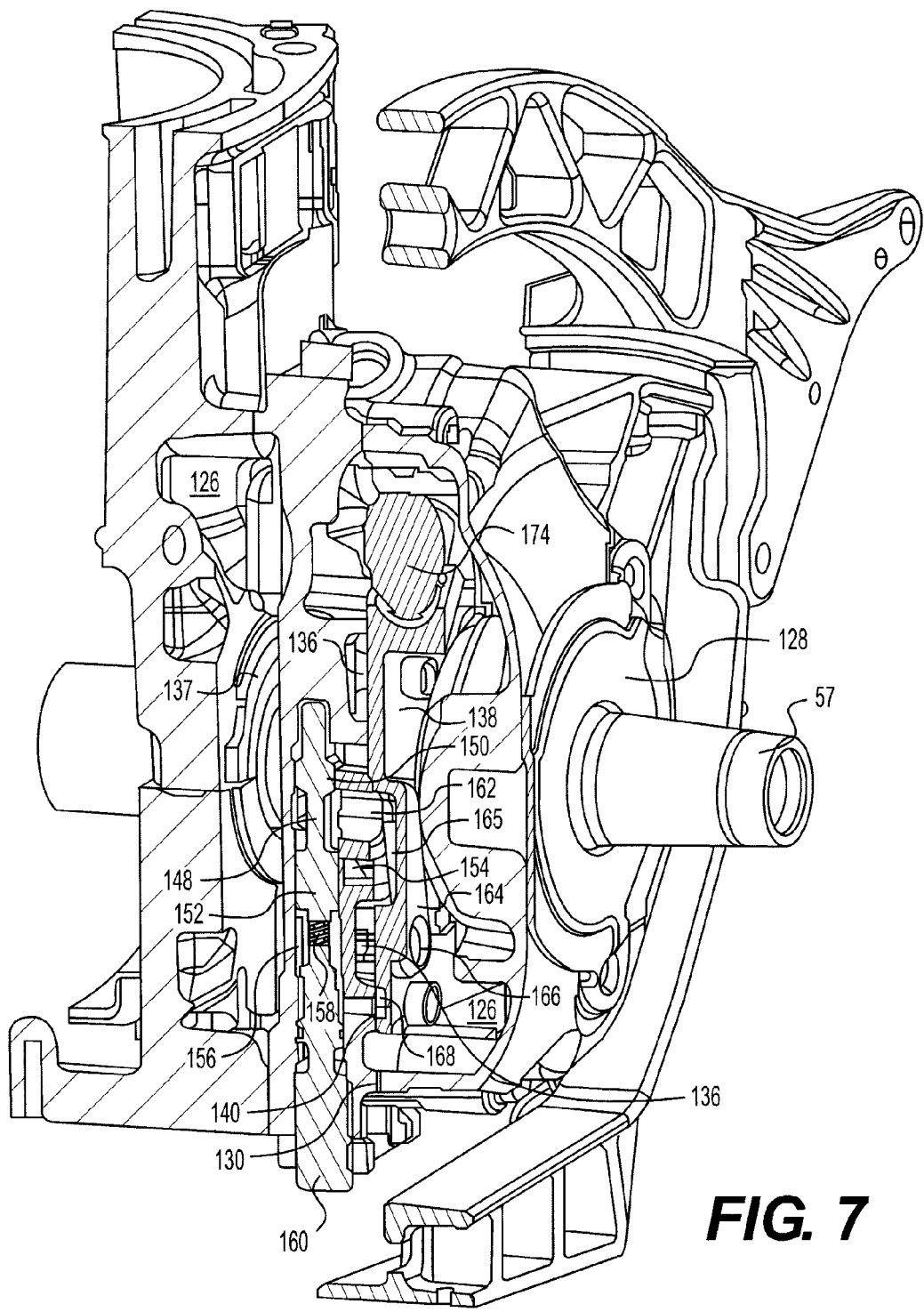
FIG. 7 is a cross-sectional view of the portion of the casing of FIG. 4 taken through line 7-7 of FIG. 4 with the inner reservoir cover and an outer reservoir cover mounted to the casing.

As best seen in FIG. 7, the hydraulic system is provided with a piloted proportional pressure relief valve 148. It is contemplated that a non-piloted valve could be provided instead of the piloted proportional pressure relief valve 148. The piloted proportional pressure relief valve 148 controls fluid communication between the second reservoir 136 and the first reservoir 126 so as to control a hydraulic pressure in the second reservoir 136. By controlling the hydraulic pressure in the second reservoir 136, the hydraulic pressure in the CVT chamber 110 is also controlled, which in turn controls the position of the movable sheave 84 with respect to the fixed sheave 82, and therefore controls the drive ratio of the CVT 40.

The piloted proportional pressure relief valve 148 has a bell-shaped upper end 150 disposed in the second reservoir 136 near an outlet of the pump 118. A lower end 152 of the piloted proportional pressure relief valve 148 closes and opens a passage 154 from the second reservoir. A piloted proportional pressure relief valve chamber 156 is disposed adjacent the lower end 152 of the piloted proportional pressure relief valve 148. The piloted proportional pressure relief valve chamber 156 contains hydraulic fluid. The hydraulic pressure in the piloted proportional pressure relief valve chamber 156 biases the piloted proportional pressure relief valve 148 upwardly toward its closed position (i.e. the position shown in FIG. 7, with the lower end 152 of the piloted proportional pressure relief valve closing the passage 154 completely). The amount of hydraulic pressure in the piloted proportional pressure relief valve chamber 156, and therefore the amount of upward bias on the piloted proportional pressure relief valve, can be controlled as will be described below. A spring 158 is disposed in the piloted proportional pressure relief valve chamber 156 between the lower end 152 of the piloted proportional pressure relief valve and the upper end of a threaded plug 160. The spring 158 also biases the piloted proportional pressure relief valve 148 upwardly toward its closed position. By screwing and unscrewing the threaded plug 160, a degree of preloading of the spring 158 can be adjusted which in turn controls the amount of bias provided by the spring 158. The hydraulic pressure on the bell-shaped upper end 150 biases the piloted proportional pressure relief valve 148 downwardly toward an opened position (i.e. a position where the lower end 152 of the piloted proportional pressure relief valve 148 does not close the passage 154 completely). It should be understood that the piloted proportional pressure relief valve 148 has multiple opened positions each providing a different degree of opening of the passage 154. When the downward force on the piloted proportional pressure relief valve 148 due to the hydraulic pressure acting on the upper end 150 exceeds the upward force on the piloted proportional pressure relief valve 148 due to the hydraulic pressure acting on the lower end 152 and the bias of the spring 158, the piloted proportional pressure relief valve 148 moves downwardly to an opened position.

When the piloted proportional pressure relief valve 148 is in an opened position, hydraulic fluid flows through the passage 154 from the second reservoir 136, to a chamber 162 disposed between the ends 150, 152 of the piloted proportional pressure relief valve 148. From the chamber 162, the hydraulic fluid flows into a return passage 164 (best seen in FIG. 6) to the first reservoir 126. The return passage 164 is formed between the cover 138 and a metal gasket 165 (best seen in FIG. 8) disposed between the cover 138 and the protruding lip 140. The outlet 166 of the return passage 164 is located near the bottom of the first reservoir 126 such that the outlet 166 is disposed below a level of hydraulic fluid in the first reservoir 126, thus reducing the likelihood of air bubbles being formed by the hydraulic fluid flowing into the first reservoir 126 from the return passage 164. Therefore, as the degree of opening of the piloted proportional pressure relief valve 148 is increased, the hydraulic pressure in the second reservoir 136 is reduced, which reduces the hydraulic pressure in the CVT chamber 110, which in turn causes the movable sheave 84 to move away from the fixed sheave 82 due to the bias of the spring 112. As the degree of opening of the piloted proportional pressure relief valve 148 is decreased, the hydraulic pressure in the second reservoir 136 is increased, which increases the hydraulic pressure in the CVT chamber 110, which in turn causes the movable sheave 84 to move toward the fixed sheave 82. Thus, by controlling a degree of opening of the piloted proportional pressure relief valve 148 as described below, the position of the movable sheave 84 with respect to the fixed sheave 82, and therefore the drive ratio of the CVT 40, can be controlled.

Figure 8:
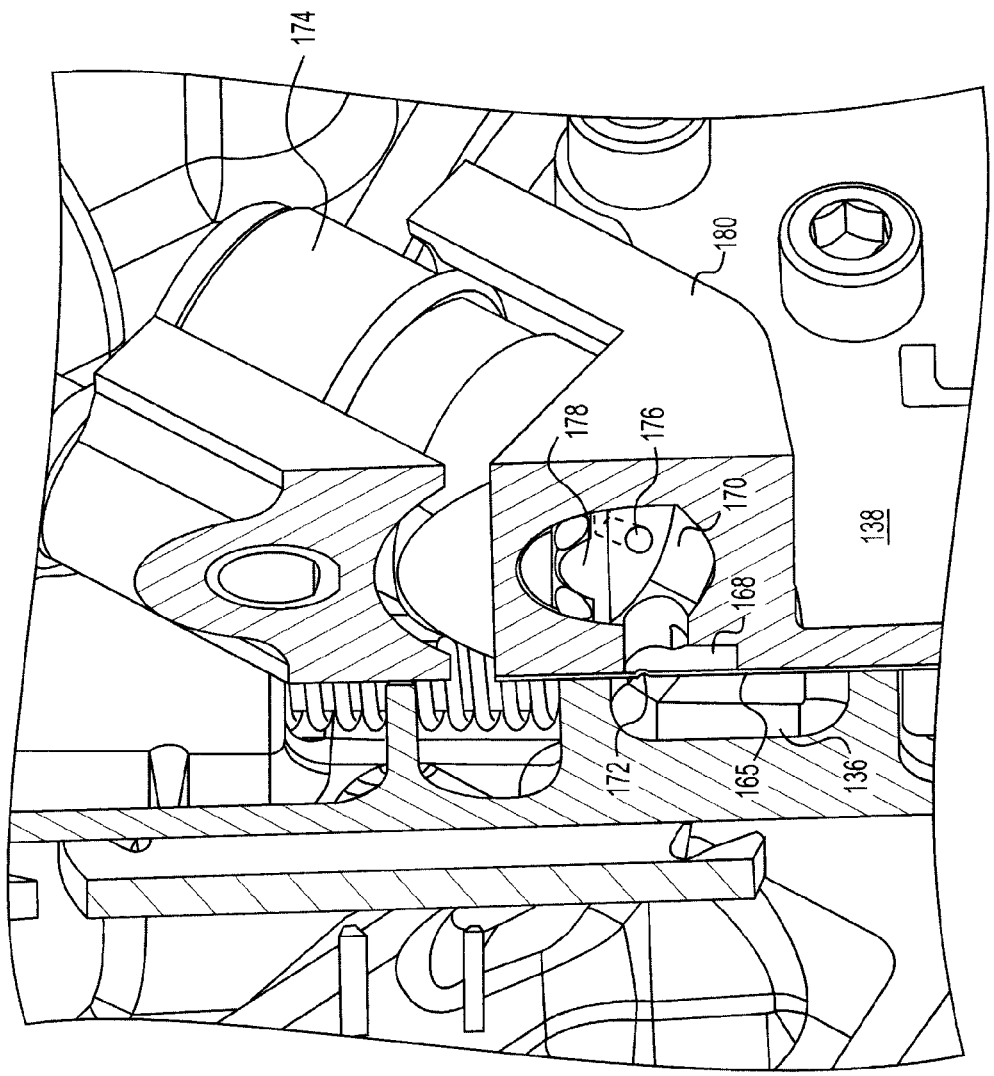
FIG. 8 is a cross-sectional view of the portion of the casing of FIG. 4 taken through line 8-8 of FIG. 6.
Figure 9:
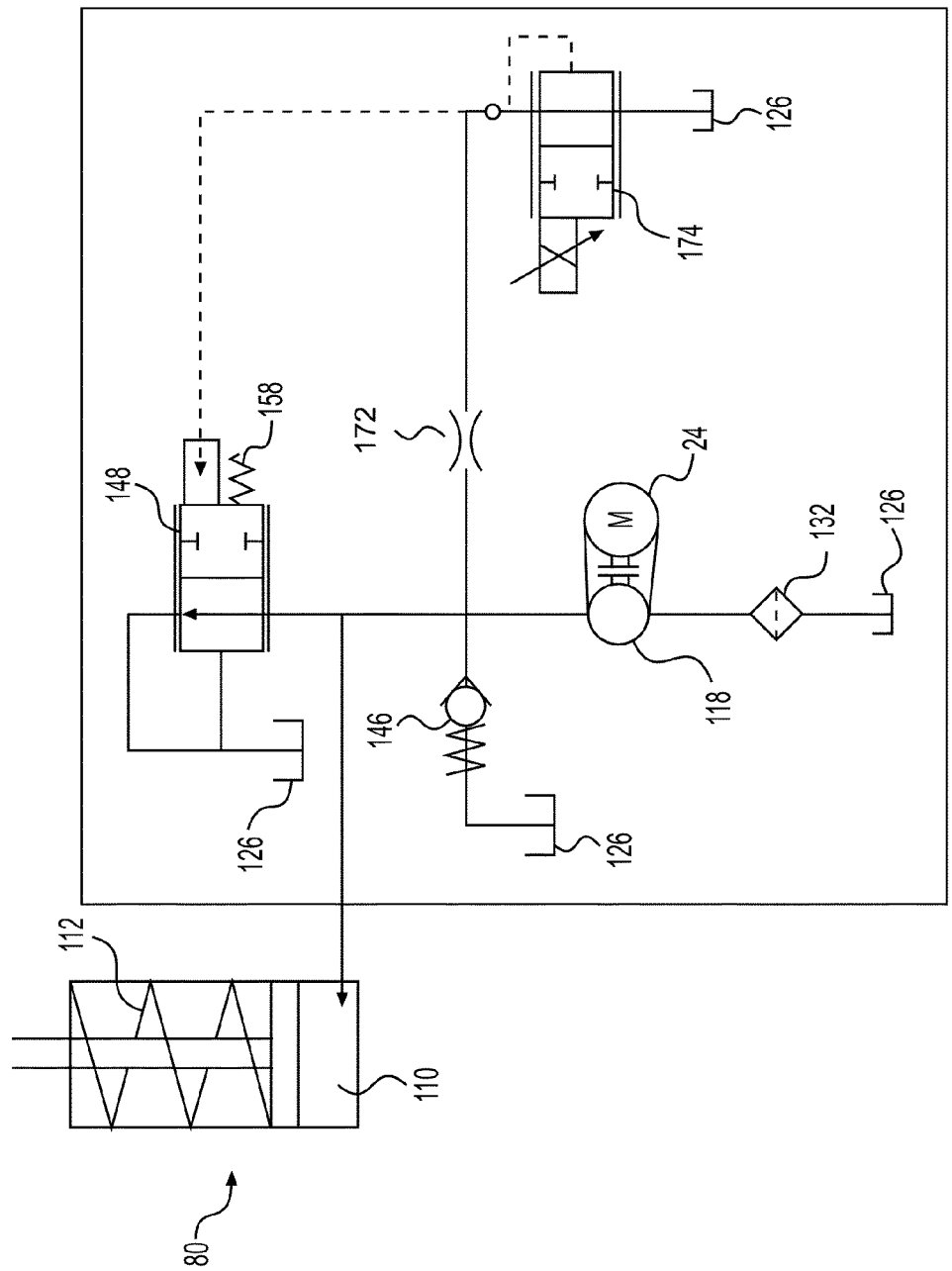
FIG. 9 is a diagram of the hydraulic system for the CVT.

The piloted proportional pressure relief valve chamber 156 fluidly communicates with a piloted proportional pressure relief valve passage 168 (best seen in FIG. 6). The piloted proportional pressure relief valve passage 168 is formed between the cover 138 and the metal gasket 165. The piloted proportional pressure relief valve passage 168 extends upwardly to a pilot valve chamber 170 (FIG. 8). As seen in FIG. 8, an opening 172 in the metal gasket 165 communicates the piloted proportional pressure relief valve passage 168 with the second reservoir 136 such that hydraulic fluid can be supplied from the second reservoir 136 to the piloted proportional pressure relief valve chamber 156 via the piloted proportional pressure relief valve passage 168. An electronically controlled pilot valve in the form of a solenoid 174 is disposed adjacent to the pilot valve chamber 170. It is contemplated that other types of electronically controlled pilot valve could be used. The solenoid 174 is held in a holder 180. A passage 176 in the solenoid fluidly communicates the pilot valve chamber 170 with the first reservoir 126. The solenoid 174 and passage 176 together form an electronically controlled pilot valve. The solenoid 174 modulates the forces applied on a movable end 178 thereof (shown in FIG. 8) in response to a signal received from a control unit 200 (FIG. 10) as described below. The pressure in the pilot valve chamber 170 is then proportional to the force exerted by the solenoid 174 on its movable end 178. The movable end 178 modulates a degree of opening the passage 176 to compensate for the flow variation coming from the reservoir 136 through the opening 172. As explained above, decreasing the hydraulic pressure in the piloted proportional pressure relief valve chamber 156 reduces the upward bias on the piloted proportional pressure relief valve 148 which in turn reduces the hydraulic pressure in the CVT chamber 110, thus causing the sheaves 82, 84 to move away from each other. When the end 178 of the solenoid 174 reduces the degree of opening of the passage 176, hydraulic fluid flowing in the opening 172 from the second reservoir 136 increases the hydraulic pressure in the piloted proportional pressure relief valve chamber 156. As explained above, increasing the hydraulic pressure in the piloted proportional pressure relief valve chamber 156 increases the upward bias on the piloted proportional pressure relief valve 148 which in turn increases the hydraulic pressure in the CVT chamber 110, thus causing the sheaves 82, 84 to move toward each other. Thus, controlling an opening and closing cycle of the end 178 of the solenoid 174, controls an opening and closing cycle of the passage 176, which in turns controls the position of the movable sheave 84 with respect to the fixed sheave 82, and therefore the drive ratio of the CVT 40. The opening 172 has a smaller cross-sectional area than the cross-sectional area of the passage 176 which causes a drop in pressure between the reservoir 136 and the pilot valve chamber 170. In a preferred embodiment, the opening 172 has a circular cross-section having a 0.8 mm diameter, and the passage 176 has a circular cross-section having a 3 mm diameter.

Figure 10:
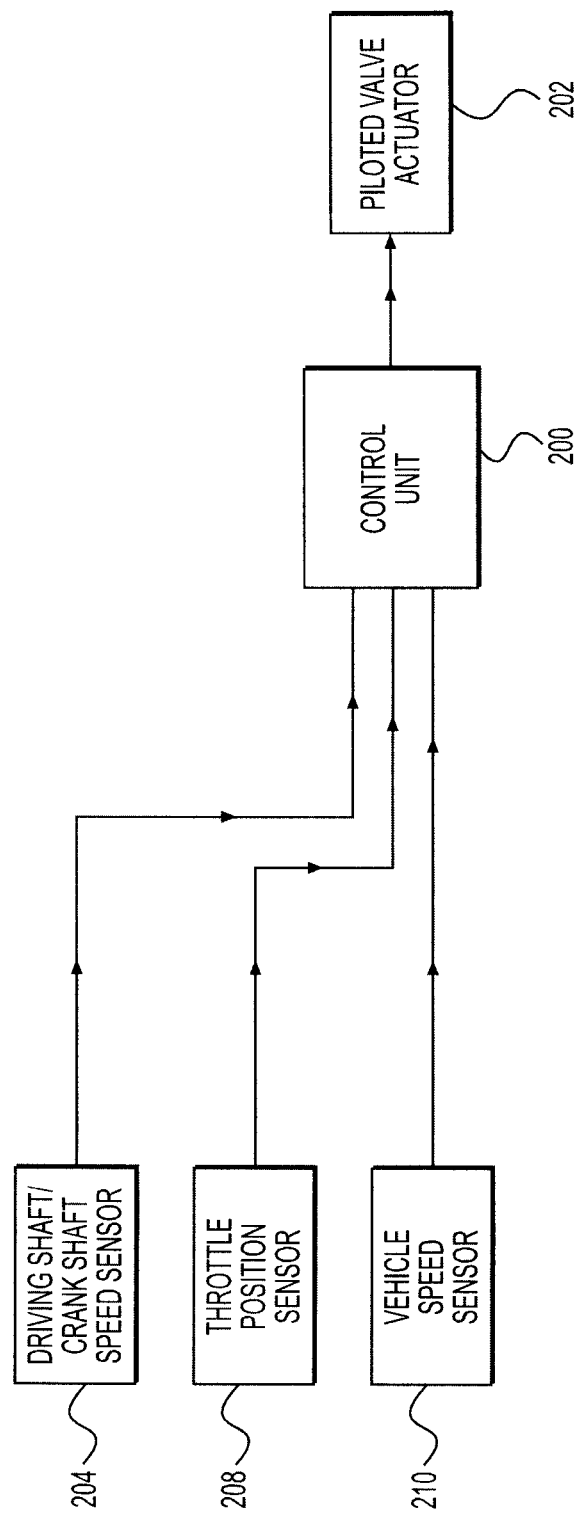
FIG. 10 is a schematic representation of elements of an electronic system of the snowmobile of FIG. 1.

Turning now to FIG. 10, elements of an electronic system of the snowmobile 10 used to control the drive ratio of the CVT 40 will be described. The electronic system includes the control unit 200. The control unit 200 receives signals from a number of sensors (described below), uses these signals to determine a clamping force to be applied to the belt 86, as described in greater detail below, such as to obtain a desired drive ratio of the CVT 40. The clamping force is the force applied on either side of the belt 86 by the sheaves 82, 84 in the axial direction of the crankshaft 57. Based on the clamping force, the control unit 200 sends a signal to a piloted valve actuator 202 to control an opening and closing cycle of the piloted proportional pressure relief valve 148 in order to obtain a hydraulic pressure in the CVT chamber 110 that will provide the clamping force to be applied. The signal sent from the control unit 200 to the piloted valve actuator 202 is preferably a pulse-width modulated (PWM) signal. In the present embodiment, the piloted valve actuator 202 consists of the solenoid 174 which is used to control the hydraulic pressure in the piloted proportional pressure relief valve chamber 156 as described above. However, it is contemplated that other types or arrangements of piloted valve actuators could be used. For example, the piloted valve actuator 202 could be a solenoid mechanically actuating the valve 148.

A driving shaft speed sensor 204 senses a speed of rotation of the crankshaft 57 (or other driving shaft associated with the driving pulley 80) and sends a signal representative of the speed of rotation of the crankshaft 57 to the control unit 200. A throttle position sensor 208 senses a position of the throttle valve 96 and sends a signal representative of this position to the control unit 200. The position of the throttle valve 96 is preferable determined as a percentage of opening of the throttle valve 96 (0% being a fully closed position and 100% being a fully opened position), however it is contemplated that the position of the throttle valve 96 could be determined in terms of degrees of opening or any other suitable terms. A vehicle speed sensor 210 senses a speed of the snowmobile 10 and sends a signal representative of this speed to the control unit 200. The control unit 200 determines the speed of rotation of the driven shaft (i.e. the jackshaft 92) from the signal received from the speed sensor 210. It is contemplated that driven shaft speed sensor could be provided to sense a speed of rotation of the driven shaft and send a signal representative of the speed of rotation of the driven shaft to the control unit 200. The above sensors 204, 208 and 210 could be of any type suitable for their intended purposes, as would be understood by a person skilled in the art. The signals sent from the sensors 204, 208 and 210 to the control unit 200 preferably use a Controller-Area Network (CAN) protocol.

Figure 11:
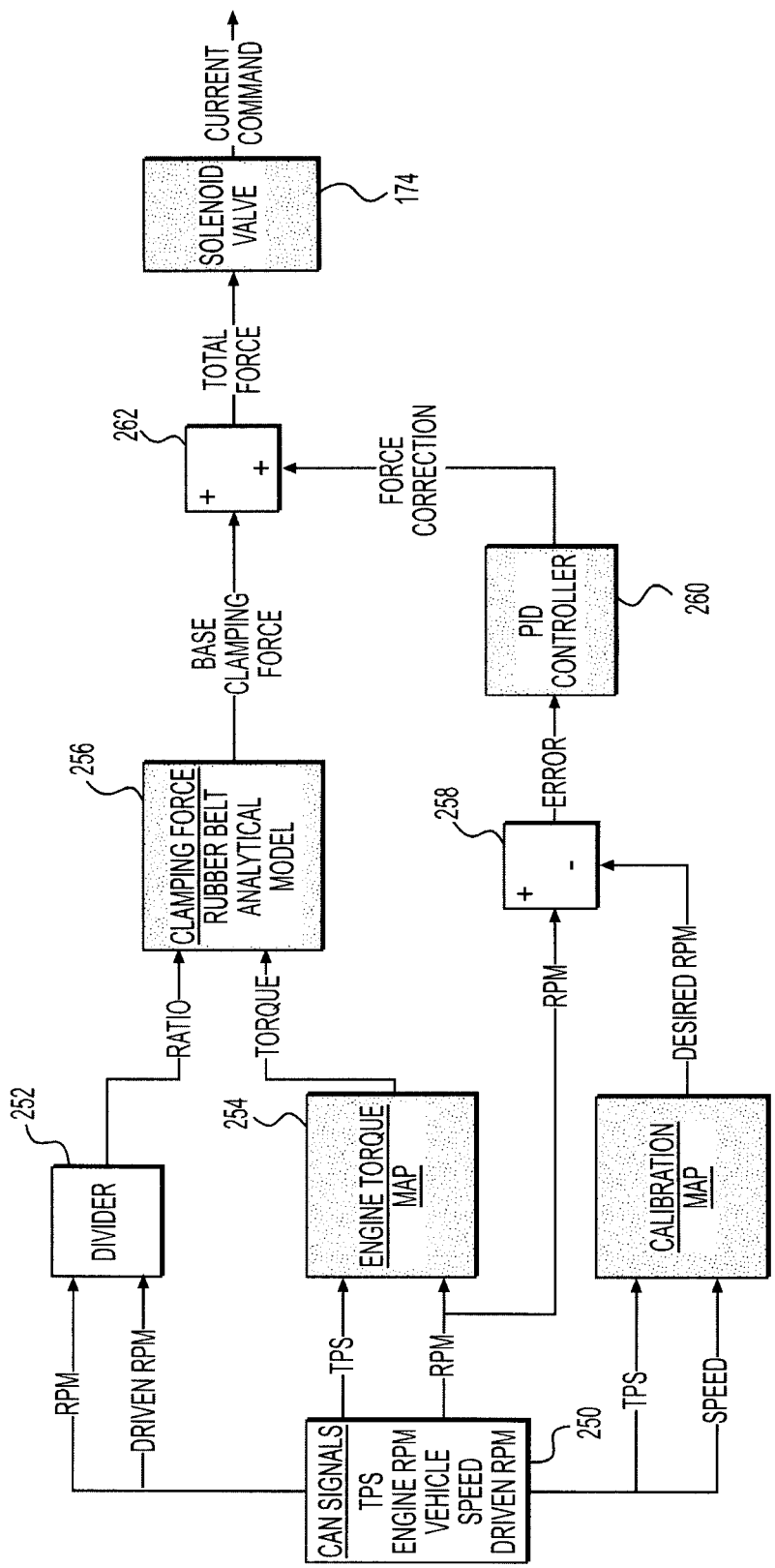
FIG. 11 is a flow chart illustrating a method of controlling the CVT.

Turning now to FIG. 11, the method by which the control unit 200 determines the clamping force to be applied to the belt 86 by the driving pulley 80, and from which the control unit 200 determines the signal to be sent to the solenoid 174 (or other piloted valve actuator 202) will be described. From the signals 250 received from the sensors 204, 208 and 210, the control unit 200 determines the current drive ratio of the CVT 40 by running the speed of rotation of the crankshaft 57 and the speed of rotation of the driven shaft through a divider 252 (i.e. drive ratio=driving speed/driven speed). It is contemplated that the control unit 200 could determine the drive ratio of the CVT 40 by using other inputs and methods. For example, the drive ratio of the CVT 40 could be determine by comparing the distance between the sheaves 82, 84 of the driving pulley 80 to the distance between the sheaves 87, 89 of the driven pulley 88. The control unit 200 also determines the engine torque by using the position of the throttle valve 96 and the speed of rotation of the crankshaft 57 together with an engine torque map 254 such as the one shown in FIG. 13. In FIG. 13, the position of the throttle valve 96 appears in terms of percentage of opening of the throttle valve 96. The engine torques given in the table of FIG. 13 are in Newton-meters (Nm). It is contemplated that the control unit 200 could determine the engine torque by using other inputs and methods.

By using the current drive ratio of the CVT 40 and the engine torque determined above, the control unit 200 determines a base clamping force. The determination of the base clamping force is made using an analytical model 256. FIG. 14 shows a clamping force map which was made based on the analytical model. The base clamping forces given in the table of FIG. 14 are in Newtons (N).

The control unit 200 also determines a desired speed of rotation of the crankshaft 57 by using the position of the throttle valve 96 and the speed of the snowmobile 10 together with a calibration map such as one of the ones shown in FIGS. 12A and 12B. The desired speeds of rotation of the crankshaft 57 given in the tables of FIGS. 12A and 12B are in rotations per minute (RPM).

In one embodiment, the driver of the snowmobile 10 can select one of two or more driving modes using a manually actuated switch 62 (FIG. 1), where each driving mode has a corresponding calibration map. The selected driving mode is preferably displayed to the driver on a display cluster (not shown) of the snowmobile 10. For example, in a snowmobile 10 having two driving modes, the calibration map shown in FIG. 12A could correspond to a "fuel economy" mode and the calibration map in FIG. 12B could correspond to a "performance" mode. As their names suggest, the calibration map of FIG. 12A provides good fuel consumption while the calibration map of FIG. 12B provides improved vehicle performances compared to the "fuel economy" mode.

It is contemplated that the control unit 200 could determine the desired speeds of rotation of the crankshaft 57 by using other inputs and methods.

The values given in FIGS. 12A to 14 are for exemplary purposes. It should be understood that these values would vary depending on the vehicle, powertrain, and/or CVT characteristics and the desired performance characteristics of the vehicle. For example, the clamping force values given in the map of FIG. 14 would vary depending on the spring constant of the spring 112.

The control unit 200 then determines a difference (error) between the current speed of rotation of the crankshaft 57 and the desired speed of rotation of the crankshaft 57 determined above by running these values through a comparator 258. This difference is then inserted in a proportional-integral-derivative (PID) controller 260 which determines a corrective clamping force. It is contemplated that the control unit 200 could determine the corrective clamping force by using other types of controllers.

The base clamping force and the corrective clamping force determined above are then added using a summer 262 to obtain a total clamping force. The control unit 200 finally sends a signal to the solenoid 174 controlling a pulse-width-modulation duty cycle which modulates the degree of opening of the passage 176 such that a resulting hydraulic pressure in the CVT chamber 110 will cause the movable sheave 84 to apply the total clamping force to the belt 86, thus controlling the drive ratio of the CVT 40. The total clamping force is lower than the base clamping force when the desired speed of rotation of the crankshaft 57 is higher than the current speed of rotation of the crankshaft 57. The total clamping force is higher than the base clamping force when the desired speed of rotation of the crankshaft 57 is lower than the current speed of rotation of the crankshaft 57.

In the embodiment where the driver of the snowmobile 10 can switch from between the calibration maps of FIGS. 12A and 12B, during operation of the snowmobile 10, switching from the calibration map of FIG. 12B to the calibration map of FIG. 12A will generally result in the speed of rotation of the crankshaft 57 to decrease (since the desired speed of rotation of the crankshaft 57 decreases) and in the total clamping force to increase, thus maintaining the speed of the snowmobile 10.

It is contemplated that the summer 262 could be replaced by a comparator. In such an embodiment, either the inputs to the comparator 258 are inverted or the PID controller 260 has a negative gain.

The calibration map, engine torque map, clamping force map, and the PID controller 260 are preferably set such that once the snowmobile 10 reaches a desired (i.e. constant) speed following an acceleration, the total clamping force can be increased. This allows a speed of rotation of the crankshaft 57 to be reduced while still maintaining the speed of the snowmobile 10 constant. It is contemplated that, depending on the engine configuration, a degree of opening of the throttle valve 96 may have to be increased in order to maintain the speed of the snowmobile 10 constant. This results in improved fuel consumption compared to a snowmobile having a centrifugal CVT.

It is contemplated that the calibration map, engine torque map, clamping force map, and the PID controller 260 could also be set such that as the position of the throttle valve 96 decreases, a rate of reduction of the total clamping force is lower than a rate of reduction of the position of the throttle valve 96 which causes engine braking.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle powertrain comprising:
    an engine;
    a crankshaft extending from the engine and being driven by the engine, the crankshaft having a passage defined therein;
    a shaft connected to and driven by the crankshaft;
    a driven shaft operatively connected to the shaft;
    a pump fluidly communicating with the passage;
    a first hydraulic fluid reservoir fluidly communicating with the pump;
    a second hydraulic fluid reservoir fluidly communicating with the pump; and
    a continuously variable transmission operatively connecting the shaft with the driven shaft, the continuously variable transmission including:
        a driving pulley disposed on the shaft for rotation therewith;
        a driven pulley disposed on the driven shaft for rotation therewith; and
        a belt operatively connecting the driving pulley with the driven pulley, the driving pulley including:
            a fixed sheave disposed on the shaft for rotation therewith;
            a movable sheave disposed on the shaft for rotation therewith, the belt being disposed between the fixed sheave and the movable sheave, the fixed sheave being disposed between the movable sheave and the engine;
            a spring biasing the movable sheave away from the fixed sheave; and
            a CVT chamber fluidly communicating with the passage of the crankshaft;
    the pump supplying hydraulic fluid from the first reservoir to the second reservoir, the hydraulic fluid flowing from the second reservoir to the passage in the crankshaft, the hydraulic fluid flowing from the passage to the CVT chamber to bias the movable sheave toward the fixed sheave; wherein the passage in the crankshaft includes:
        an axial passage extending axially in the crankshaft; and
        at least one inlet passage extending radially from the axial passage to an outer surface of the crankshaft, the at least one inlet passage fluidly communicating the axial passage with the pump, and the axial passage fluidly communicating the at least one inlet passage with the CVT chamber.

2. The powertrain of claim 1, wherein the pump is mechanically driven by the engine.

3. The powertrain of claim 1, wherein the second reservoir surrounds the crankshaft and the first reservoir surrounds the second reservoir.

4. The powertrain of claim 1, further comprising a pressure release valve selectively fluidly communicating the second reservoir with the first reservoir.

5. The powertrain of claim 1, further comprising:
    a proportional pressure relief valve selectively fluidly communicating the second reservoir with the first reservoir for controlling the hydraulic pressure in the CVT chamber; and
    a proportional pressure relief valve chamber being disposed adjacent an end of the proportional pressure relief valve;
    wherein hydraulic pressure in the proportional pressure relief valve chamber biases the proportional pressure relief valve toward a closed position preventing the flow of hydraulic fluid from the second reservoir to the first reservoir.

6. The powertrain of claim 5, further comprising a spring in the proportional pressure relief valve chamber, the spring biasing the proportional pressure relief valve toward the closed position.

7. The powertrain of claim 5, further comprising:
    a proportional pressure relief valve passage fluidly communicating with the proportional pressure relief valve chamber, the proportional pressure relief valve passage supplying hydraulic fluid to the proportional pressure relief valve chamber via a first opening fluidly communicating the proportional pressure relief valve passage with the second reservoir; and an electronically controlled pilot valve controlling fluid communication between the proportional pressure relief valve passage and the first reservoir via a second opening for controlling the hydraulic pressure in the proportional pressure relief valve chamber;

wherein a diameter of the first opening is smaller than a diameter of the second opening.

8. The powertrain of claim 5, wherein an end of the proportional pressure relief valve opposite the end of the proportional pressure relief valve adjacent the proportional pressure relief valve chamber is bell-shaped;

wherein the bell-shaped end extends in the second reservoir; and wherein hydraulic pressure on the bell-shaped end biases the proportional pressure relief valve toward an opened position allowing the flow of hydraulic fluid from the second reservoir to the first reservoir.

9. The powertrain of claim 1, wherein the engine has an engine casing; and wherein at least one of the first and second reservoirs is formed between the engine casing and a cover connected to the engine casing.

10. The powertrain of claim 1, wherein when removing the belt from the continuously variable transmission, the belt is moved over the movable sheave in a direction away from the engine.

11. A vehicle powertrain comprising:
an engine, the engine having:
an engine casing; and
a crankshaft extending through a portion of the engine casing, the crankshaft having a passage defined therein;
a shaft connected to and driven by the crankshaft;
a continuously variable transmission driving pulley disposed on the shaft for rotation therewith, the driving pulley including:
a fixed sheave disposed on the shaft for rotation therewith;
a movable sheave operatively connected with the fixed sheave;
a spring biasing the movable sheave away from the fixed sheave; and
a CVT chamber fluidly communicating with the passage of the crankshaft;
a hydraulic fluid reservoir disposed between the portion of the engine casing and the fixed sheave, the reservoir fluidly communicating with the passage of the crankshaft;
a pump fluidly communicating with the reservoir, the pump supplying hydraulic fluid from the reservoir to the passage in the crankshaft, the hydraulic fluid flowing from the passage to the CVT chamber to bias the movable sheave toward the fixed sheave; wherein the passage in the crankshaft includes: an axial passage extending axially in the crankshaft; and at least one inlet passage extending radially from the axial passage to an outer surface of the crankshaft, the at least one inlet passage fluidly communicating the axial passage with the pump, and the axial passage fluidly communicating the at least one inlet passage with the CVT chamber.

12. The powertrain of claim 11, wherein the reservoir is a first reservoir;
the powertrain further comprising a second hydraulic fluid reservoir; and wherein the pump supplies hydraulic fluid from the first reservoir to the second reservoir, and the hydraulic fluid flows from the second reservoir to the passage in the crankshaft.

13. The powertrain of claim 12, further comprising:
a proportional pressure relief valve selectively fluidly communicating the second reservoir with the first reservoir for controlling the hydraulic pressure in the CVT chamber; and
a proportional pressure relief valve chamber being disposed adjacent an end of the proportional pressure relief valve;
wherein hydraulic pressure in the proportional pressure relief valve chamber biases the proportional pressure relief valve toward a closed position preventing the flow of hydraulic fluid from the second reservoir to the first reservoir.

14. The powertrain of claim 13, further comprising a spring in the proportional pressure relief valve chamber, the spring biasing the proportional pressure relief valve toward the closed position.

15. The powertrain of claim 13, further comprising:
a proportional pressure relief valve passage fluidly communicating with the proportional pressure relief valve chamber, the proportional pressure relief valve passage supplying hydraulic fluid to the proportional pressure relief valve chamber via a first opening fluidly communicating the proportional pressure relief valve passage with the second reservoir; and
an electronically controlled pilot valve controlling fluid communication between the proportional pressure relief valve passage and the first reservoir via a second opening for controlling the hydraulic pressure in the proportional pressure relief valve chamber;
wherein a diameter of the first opening is smaller than a diameter of the second opening.

16. The powertrain of claim 13, wherein an end of the proportional pressure relief valve opposite the end of the proportional pressure relief valve adjacent the proportional pressure relief valve chamber is bell-shaped;
wherein the bell-shaped end extends in the second reservoir; and
wherein hydraulic pressure on the bell-shaped end biases the proportional pressure relief valve toward an opened position allowing the flow of hydraulic fluid from the second reservoir to the first reservoir.

17. The powertrain of claim 11, wherein the reservoir is formed between the portion of the engine casing and a cover connected to the engine casing.

18. The powertrain of claim 11, wherein the fixed sheave is disposed between the movable sheave and the engine.

19. The powertrain of claim 11, further comprising:
a driven pulley; and
a belt operatively connecting the driving pulley with the driven pulley, the belt being disposed between the fixed sheave and the movable sheave.

20. An internal combustion engine comprising:
an engine casing;
a crankshaft extending through the engine casing;
an axial passage extending axially in the crankshaft, the axial passage defining an opening in an end of the crankshaft disposed externally of the engine casing, the opening permitting the passage of fluid therethrough; and
at least one inlet passage extending from the axial passage to an outer surface of the crankshaft; wherein the at least one inlet passage extends radially from the axial passage to the outer surface of the crankshaft, the at least one inlet passage fluidly communicating the axial passage with a pump, and the axial passage fluidly communicating the at least one inlet passage with a CVT chamber.

21. The engine of claim 20, further comprising a hydraulic fluid reservoir disposed externally of the engine casing; wherein:
- the crankshaft extends through the reservoir; and
- an opening defined by the at least one inlet passage in the outer surface of the crankshaft is located in the reservoir such that the at least one inlet passage fluidly communicates the axial passage with the reservoir.

22. The engine of claim 21, wherein the reservoir is formed between the engine casing and a cover connected to the engine casing.

23. The engine of claim 20, further comprising:
- a driving pulley connected to the crankshaft by a bolt;
- the bolt having a passage fluidly communicating with the axial passage.

24. The engine of claim 23, wherein the bolt is screwed in the opening in the end of the crankshaft.

* * * * *